(12) United States Patent
Gates et al.

(10) Patent No.: US 6,411,938 B1
(45) Date of Patent: Jun. 25, 2002

(54) CLIENT-SERVER ONLINE PAYROLL PROCESSING

(75) Inventors: Martin O. Gates, Sunnyvale; René A. Lacerte, Woodside; Robert G. Sage, Menlo Park, all of CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 09/395,867

(22) Filed: Sep. 14, 1999

(51) Int. Cl.[7] .............................................. G06F 17/60
(52) U.S. Cl. .......................................... 705/30; 705/45
(58) Field of Search ................................ 705/30, 1, 45, 705/32

(56) References Cited

U.S. PATENT DOCUMENTS 5,117,353 A * 5/1992 Stipanovich et al.
5,600,554 A * 2/1997 Williams
5,909,673 A * 6/1999 Gregory ...................... 705/45

FOREIGN PATENT DOCUMENTS

WO    WO 01/24090 A1 * 4/2001 ........... G06F/17/60

OTHER PUBLICATIONS

Lone Star Bakery Streamlines its HR/Payroll Departments with Abra Cadabra Software, Dortch Adrienne, Personnel Journal Marketplace Supplement, pp. 4, Nov. 1993.*
Making Payroll a Profit Center, Cheney Glenn, Accounting Technology, v14n9 pp. S3–S10, Oct. 1998.*
The Twists and Turns of Payroll Consulting, Kahan Stuart, Practical Accountant, v31n12 pp. 45–49, Dec. 1998.*
21st Century Payroll, Cohn Michael, Accounting Technology, v12n2, pp. 18–29, Feb./Mar. 1996.*

* cited by examiner

*Primary Examiner*—Kenneth R. Rice
*Assistant Examiner*—Lynda Jasmin
(74) *Attorney, Agent, or Firm*—Fenwick & West LLP

(57) ABSTRACT

Online client-server payroll processing is provided by a client computer executing a combined accounting and payroll software product that administers both financial accounting functions (e.g., various expense and income accounts) and payroll functions including setup and maintenance of employee and employer payroll information, and which calculates paycheck information for selected employees, using the payroll setup information and stored tax table information. The software is used to locally print payroll checks for those employees not receiving their pay by direct deposit, and to print advice of deposit slips for this latter type of to employee. The calculated payroll information is transmitted over a communications network, such as the Internet, to a payroll computer system. The payroll computer system checks the integrity of the transmitted payroll, and effects the appropriate ACH transactions for those employee who are paid by direct deposit. The payroll computer system also makes tax payments for the employees and employer to the appropriate tax agency, and periodically files with such agencies the required tax liability and wage reports.

9 Claims, 10 Drawing Sheets

Prior Payments of Taxes and Liabilities

Payment Date: 10/29/1999  For Period Ending: 09/30/1999

Taxes and Liabilities

| Item Name | Amount | Memo |
|---|---|---|
| | | |

Buttons: Next Period, Prev Payments, Done, Cancel, Accounts Affected

FIG. 8

Select Employees To Pay

Bank Account: Checking

☑ To be printed

○ Enter hours and preview check before creating
○ Create check without preview using hours below and last quantities Check Date: 12/15/1999  Pay Period Ends: 12/24/1999

| ✓ | Employee | Pay Period | Rate | Hours | Last Date |
|---|---|---|---|---|---|
| ✓ | Dan T. Miller | Biweekly | 596.15 | 8:00 | 12/10/1999 |
| | Elizabeth N. Mason | Biweekly | 14.75 | 40:00 | 12/10/1999 |
| | Gregg O. Schneider | Biweekly | 17.25 | 8:00 | 12/10/1999 |

Buttons: Create, Print Paycheck, Leave, Unmark All

| Preview Paycheck | | | | | | | |
|---|---|---|---|---|---|---|---|
| Dan T. Miller | | | | | Pay Period | 12/11/1999 | 12/24/1999 |

Earnings

| Item Name | Role | Hours | Customer Job | Service Item | |
|---|---|---|---|---|---|
| Salary | | 1,596.15 | 9.00 | Pretell Real estate: 75 Sunset Ri | Framing |

| Sick Available | 20:00 |
|---|---|
| Vacation Avail | 86:45 |
| Sick Accrued | |
| Vac. Accrued | 6:45 |
| ☐ Do not accrue time | |

Other Payroll Items

| Item Name | Rate | Quantity |
|---|---|---|
| Health Insurance | -25.00 | |

Employee Summary

| Item Name | Amount | YTD |
|---|---|---|
| Salary | 1,596.15 | 39,903.78 |
| Health Insurance | 0.00 | 800.00 |
| Federal Withholding | -155.00 | -4,037.00 |
| Social Security Employee | -98.97 | -2,573.00 |
| Medicare Employee | -23.15 | -601.75 |
| CA - Employee | -24.98 | -557.22 |
| CA - Disability Employee | 0.00 | 158.84 |

Company Summary

| Item Name | Amount | YTD |
|---|---|---|
| CA - Employee Training Task | 0.00 | 7.00 |
| Social Security Company | 98.97 | 2,573.00 |
| Medicare Company | 23.15 | 610.75 |
| Federal Unemployment | 0.00 | 56.00 |
| CA - Unemployment Company | 0.00 | 367.50 |

Check Amount 1,294.05

[ Create ] [ Cancel ] [ Help ]

Online Payroll Service ▼ How Do I? ☒

QuickBooks
ONLINE PAYROLL SERVICE

Last accessed: 08/25/1999
Payroll Service ID: 606000856
Tax Table Version: 9909

[ Close ]

Items To Send

| 0 Paychecks for $0 |
|---|
| Taxes: $0 |
| Direct Deposit: $0 |
| Direct Deposit: $0 |
| Required Funds: $0 |
| Payroll Data: employees, payroll items... |

[ Go Online ]
[ View ]

Items Received From Payroll Service

| 08/05/1999: Payroll data confirmation |
|---|

[ View ]
[ Delete ]

Service provided by Intuit and Computing Resources, Inc.

FIG. 10

| Pay Liabilities | | | |
|---|---|---|---|
| ☑ To be printed | ○ Create liability check without reviewing | | Create |
| Checking Account | | | Cancel |
| Checking ▼ | ● Review liability check to enter expenses/penalties | | Report |
| Payment Date 12/15/1999 | Show liabilities from 01/01/1999 through 11/30/1999 | | |

Sort by: Payable To — Mark All

| ✓ | Payroll Item | Payable To | Amt. Due | Amt. To Pay |
|---|---|---|---|---|
| | CA - Disability Employee | Employment Development | 59.93 | 0.00 |
| | CA - Employee Training Tax | Employment Development | 0.46 | 0.00 |
| | CA - Unemployment Company | Employment Development | 23.94 | 0.00 |
| | CA - Withholding | Employment Development | 426.84 | 0.00 |
| | Federal Unemployment | Great Statewide Bank | 3.64 | 0.00 |
| | Federal Withholding | Great Statewide Bank | 2,218.00 | 0.00 |
| | Medical Company | Great Statewide Bank | 268.63 | 0.00 |
| | Medical Employee | Great Statewide Bank | 268.62 | 0.00 |
| | Social Security Company | Great Statewide Bank | 1,210.53 | 0.00 |
| | | | 5,853.63 | 0.00 |

☑ Show all liabilities for this period — Ending Bank balance 10,641.07

FIG. 11

CLIENT-SERVER ONLINE PAYROLL PROCESSING

BACKGROUND

1. Field of the Invention

This invention relates generally to the computerized accounting systems and methods, and more particularly to payroll processing systems, methods and related software products.

2. Background of the Invention

Payroll is the process by which an employer determines and distributes wages to employees, including accounting for various types of withholdings such as taxes, insurance, and credits, such as reimbursements and bonuses. Due to the complexity of computing the appropriate wages, withholdings, and credits for employees, many employers hire third party payroll services to prepare the payroll for the company. Conventional payroll services are characterized by the following aspects:

i. Payroll data (employee wages, benefits, deductions, taxes, etc.) is owned by the payroll service and stored on a backend server system that is not directly accessible to the employer (payroll service customer). This is true even though the payroll data describes the details of the employer's particular payroll needs and employees.

ii. Employee hours, bonuses, changes and other exceptions for a given pay period are usually phoned or faxed from the employer to the payroll service. It is from this information that the payroll from the pay period is generated. Often restrictions apply to when an employer is allowed to contact the payroll service, and in some instances, the payroll service calls the employer at a prearranged time to obtain this information. This type of arrangement requires the employer to comply with the demands of the payroll service, and reduces the convenience and flexibility of the payroll service to the employer. Some payroll services provide client software that allows the employer to electronically transmit this same data to the payroll service.

iii. The payroll service executes payroll (net checks calculated, tax withholding amounts, deductions, etc.) on a fixed, predetermined schedule. The backend server at the payroll service enforces all tax and payroll compliance rules.

iv. Based on its own calculations, the payroll service backend server system initiates direct deposit payments and regular tax payments and tax information filings to local, state and federal tax agencies.

v. The payroll service sends the printed payroll checks (or deposit slips) either to the employer to distribute, or directly to the employees.

vi. The payroll service sends printed reports to the employer which the employer may review and must enter into their accounting system in order to properly reflect the accounting impact of the payroll.

vii. The payroll services provide tax filing information to the appropriate local, state, and federal tax agencies regarding the various amounts of wages and tax withholdings for the paid employees.

viii. When the employer or employee notices an error on one of the payroll checks, the employer calls the payroll service and arranges for the problem to be fixed in the next payroll run (usually at least a week or two later).

These aspects of the conventional payroll service relegate the employer to a minor role in the preparation of its own employees' payroll. To obtain the benefit of the payroll service, the employer must give up substantial flexibility in terms of interacting with the payroll service and control over the details of the payroll preparation. In addition, the employer must pay substantial fees for this payroll service.

This loss of control and convenience is at odds with current trends in computerization of business operations. In particular, most businesses today use accounting software to manage their financial records, such as accounts receivable and accounts payable. Further, these companies also maintain most of their employee data on computer, including data pertinent to the payroll calculations. Yet because of the complexity of payroll, even companies who otherwise manage all of their accounting turn to payroll services to handle payroll. From the perspective of the employer, it would be desirable to handle payroll as yet another part of its internal accounting—thereby giving it more control over how and when payroll is processed.

Accordingly, it is desirable to provide computer-based method and system, and software products, that integrate payroll functionality into a company's overall accounting processes, and in particular, give the company direct control of the input and management of employee information and the execution of payroll processing.

SUMMARY OF INVENTION

The present invention overcomes the limitations of conventional approaches to payroll processing by providing an online, client-server payroll processing architecture in which certain payroll functionality is divided between a client computer managed by the employer and a payroll computer system managed by a payroll service. The division of functionality gives each party control and responsibility of those aspects of payroll which it can best implement and reduces the risk of error or failure to report payroll.

In one aspect this division of payroll functionality is as follows:

Client Computer with Accounting and Payroll Software

Set up and maintenance of company and employees' payroll setup information, including employee compensation, pay periods, deductions, tax status;

Calculation of payroll taxes (gross to net calculation), and company tax liabilities arising from payroll;

Paying of employees with printed checks, and deposit advice notice; and

Record keeping for payroll.

Payroll Computer System

Movement of direct deposit funds by ACH, and paying of employees by direct deposit;

Payment of federal and state tax liabilities;

Filing of federal and state tax forms; and

Archiving of payroll backup records for the employer.

This division of functionality and responsibility advantageously gives the employer managing control of the client computer control over all of the significant details of payroll processing, just as it would if it were doing payroll by itself, but further gives it the advantages of having a payroll service complete the more complicated aspects of direct deposits, tax payments and tax filings, which many employers find difficult to master. Likewise, the payroll service managing the payroll computer system obtains the advantages of not having to setup and maintain employee-specific data-the most costly and inefficient part of payroll processing—while retaining the responsibilities it is best suited to handle, specifically the processing of ACH transactions and tax filings.

In accordance with the present invention, the client computer maintains a database of employee payroll setup information, such as each employee's wage or salary rate, tax status, benefits, deductions, and the like. This information is preferably maintained by the accounting and payroll software product, and is accessible directly from within this application, as opposed to requiring the use of different and unrelated applications for performing accounting and payroll.

This feature is advantageous because the employer now owns the payroll data, instead of a conventional payroll service. This gives the employer direct access to the payroll data, instead of indirect (and inconvenient) access through a conventional payroll service. The payroll service retains copies of the payroll data that is transmitted to it, and can help restore lost or damaged data, but the primary payroll data source is a data file stored on the client computer by the employer. A further advantage is that the employer can process payroll even if the payroll service computer is temporarily down, off-line or otherwise unavailable. Yet another advantage is that the employer can generate various types of payroll management reports at any time, without having to pay additional fees to its payroll service, or wait for such reports to be processed.

For a particular pay period, the employer enters pay period hours, bonuses, changes and other exceptions for each employee directly into the local payroll data file at his or her convenience. This is advantageous because the employer is no longer limited to providing payroll information to the payroll service at the discretion of the payroll service. This feature provides the employer with flexibility to do payroll whenever it wants with fewer data entry errors. The employer then executes payroll locally on the client computer using a combined accounting and payroll software product. The accounting and payroll software calculates for each employee the correct paycheck amount, taking into account the the employee's payroll setup information, current payroll data, and the appropriate tax and payroll compliance rules. Because the payroll is done on the client computer, the employer's accounting data and all financial reporting are up to date as of the creation of the payroll with no further input or reconciliation required by the employer. A further advantage to the employer is that the payroll service and payroll computer system maintains and delivers to the client computer up-to-date tax table information, which is provided to the client computer to ensure the accuracy of its payroll calculations.

When the accounting and payroll software is finished with the payroll calculation, the employer may review the paychecks for accuracy. Since the employer is able to review paychecks before the payroll service prints them, the employer is able to catch and correct errors before transmitting the payroll instead of waiting for the next pay cycle, as in conventional systems.

Once the employer is satisfied with the payroll, the employer prints paychecks for those employees without direct deposit, and deposit slips for those employees that do, from the accounting and payroll software product on a local printer. The employer distributes to the employees the printed checks and deposit slips. This is advantageous because the employees efficiently and quickly receive their paychecks/deposits, without requiring the intervention of the payroll service.

The employer also transmits the calculated payroll information including the appropriate wages, tax, deduction information, and the like to the payroll service for each employee. This transfer is preferably effected directly from the accounting and payroll software product.

The payroll service maintains a payroll computer system that receives the transmitted payroll information. Based on the transmitted payroll information and its own local store of payment and tax filing deadlines, the payroll computer system initiates direct deposit payments and regular payments and tax filings to local, state and federal tax agencies. Ideally, the payroll computer system does not compute the payroll information on its own since this would duplicate processing that has already been accomplished on the client computer. The payroll computer system also transmits back to the client computer confirmation that the deposits and payments have been made, and fee information charging the employer for preparing the payroll in this manner. This transmitted information is received by the accounting and payroll software, which updates its payroll status information, and further updates its transaction data to deduct the fee charged by the payroll service from the employer's financial account. The payroll computer system further stores a backup of the payroll data for the client computer. This enables it to restore any missing payroll data should the client computer's local store of this information become corrupted. The payroll computer system also periodically makes federal and state tax payments on behalf of the employer, and makes periodic (e.g., quarterly and year end) tax fillings (e.g., Federal Form 940 and 941).

BRIEF DESCRIPTIONS OF THE DRAWINGS

FIG. 5 is a dialog box for defining employee data.

FIG. 6 is a dialog box for adjusting year-to-date information for an employee.

FIG. 7 is a dialog box for adjusting a company's tax liability payment information.

FIG. 8 is a dialog box for selecting employees for a payroll period.

FIG. 9 is a dialog box for reviewing an individual employee's payroll information for a given pay period.

FIG. 10 is a dialog box for transmitting payroll information to the payroll computer system.

FIG. 11 is a dialog box for reviewing and correcting company tax liability information.

DETAILED DESCRIPTION OF THE PREFERRED EMBODIMENTS

A. System Architecture

Figure 1:
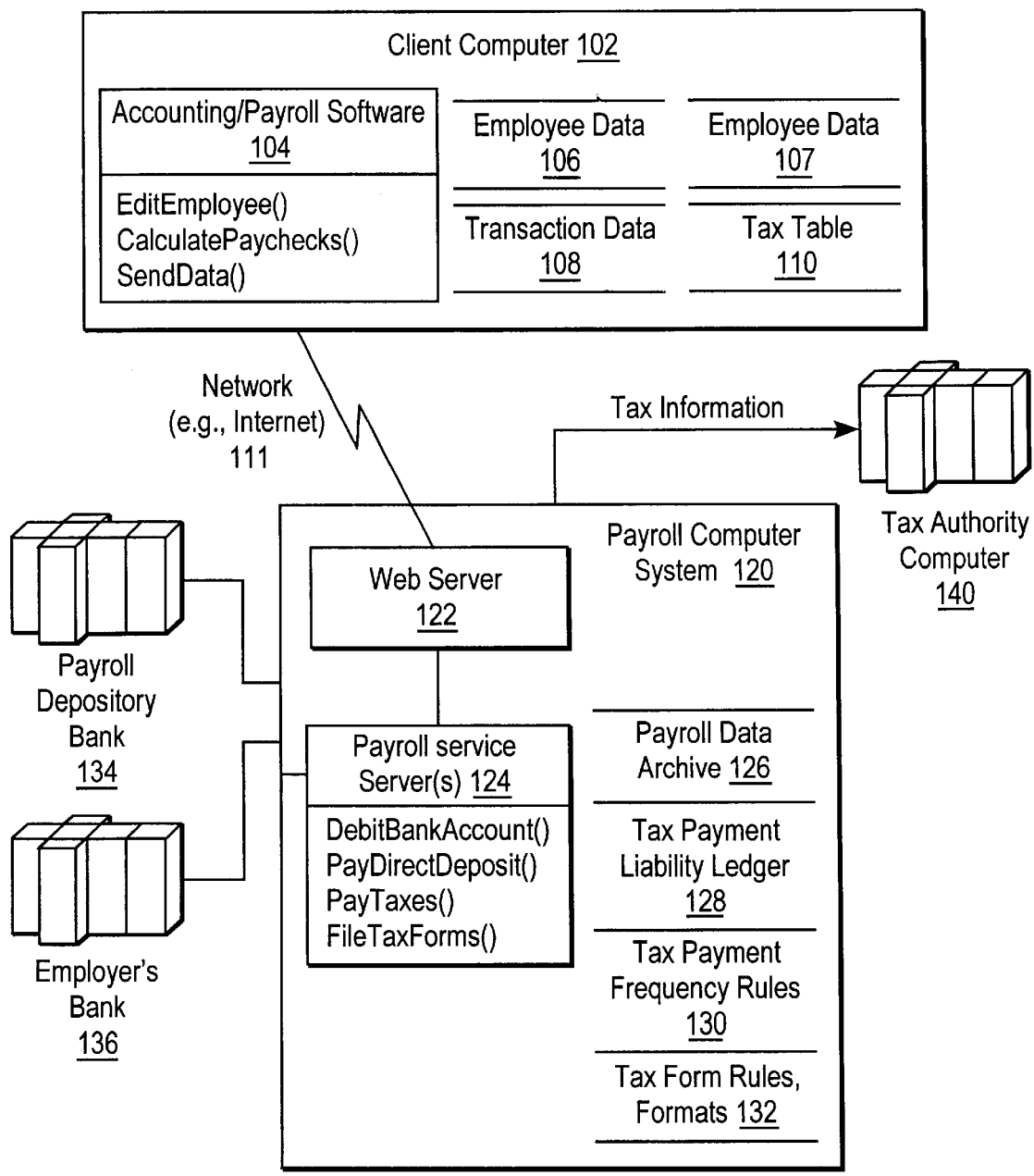
FIG. 1 is an illustration of the overall system architecture of one embodiment of the present invention.

Referring now to FIG. 1, there is shown an exemplary system architecture of one embodiment of the present invention. System 100 includes a client computer 102 and a payroll computer system 120. The client computer 102 may be a standard desktop personal computer, with a conventional operation system (e.g., Microsoft Corp.'s Windows98), processor, memory, input and output devices, and so forth. The client computer 102 is attached to a local printer (not shown). The client computer 102 further includes an accounting/payroll ("AP") software product 104 that operates in accordance with the present invention.

The AP software 104 provides both accounting and payroll processing capabilities in a single software product (which may include one or more separate executables). On the account side, the AP software 104 provides features to define various types of accounts (e.g., checking, savings, credit cards, etc.), transaction categories, payees, reports, and so forth as typically used by businesses to track business expenses and income. To support this functionality the AP software 104 stores transaction data 108 and related setup information. These features of the AP software 104 are well understood to those of skill in the art and need not be discussed in further significant detail, except as otherwise noted below.

The AP software 104 also provides payroll processing functionality in accordance with the present invention, as will be further elaborated below. This functionality generally includes the ability to define for any number of employees of the company, each employee's wages, tax status, exemptions, deductions, and so forth. This payroll setup information is stored on the client computer as employee data 106. Tax related information about the company is also stored in employer data 107.

The AP software 104 also stores tax table 110 data for performing tax computations for payroll. Using the tax table 110, and the employee data 106, the AP software 104 is used to calculate each employee's paycheck information, taking into account the employee's tax status, the appropriate tax rates for the employee, the employee's deductions and exemptions, and so forth, as would be required by law. Unlike conventional payroll processing systems, as previously described, these calculations will be the actual calculations on which the payroll is based, and not merely duplicate calculations which mirror the 'actual' payroll computed by the employer's payroll service. For those employees who receive their pay by paycheck (as opposed to direct deposit) the AP software 104 is used to print these paychecks. For employees who are paid by direct deposit, the AP software 104 prints advice of deposit slips. These paychecks and deposit slips are distributed by the employer to the employees.

While FIG. 1 illustrates that the various employee data 106, transaction data 108, and tax table 110 data stored directly on the client computer 102, this is merely for ease of illustration. These various data sources may be stored on other computers to which the client computer 102 is connected by a network connection, such as on a server on a local area network. In addition, while only one client computer 102 is illustrated, again for ease of explanation, in actual practice there will be many such client computers 102, each operated by a separate business and storing the accounting and employee information for that employer particularly.

The client computer(s) 102 is coupled via public network 111, such as the Internet to a web server 122, and communicates with the web server 122 via conventional protocols, e.g., TCP/IP and HTTP. Once the paycheck information is calculated by the AP software 104, it is transmitted over the network 111 to the web server 122. The web server 122 in turn transmits the payroll data to the payroll computer system 120. While FIG. 1 illustrates a single web server 122, in practice it is expected that multiple web servers 122 will be used in conjunction with the payroll computer system 120.

The payroll computer system 120 is anticipated to be owned and operated by a completely separate business than the employer which operates the client computer 102. Indeed, one of the advantages of the present invention is that the payroll computer system 120 operates with the client computers of different employers to provide certain payroll processing features, while the AP software 104 on each of the client computers performs other aspects of payroll processing. The payroll computer system 120 is preferably a high performance computer capable of high speed online transaction processing, such as an IBM AS/400, or similar mainframe computer. The functionality of the payroll computer system 120 may also be distributed amongst several connected computers in order to achieve the desired level of processing throughput. This is due to the fact that in an actual implementation there will be many client computers, as noted above, communicating with the payroll computer system 120.

The payroll computer system 120 includes a payroll service backend server 124 which provides payroll processing in accordance with the present invention. This processing, as will be further explained below, generally includes archiving the paycheck information in payroll archive data 126, and creating and initiating direct deposits for certain employees via a payroll depository bank 134. The payroll service server 124 also transmits tax filing information stored in the tax payment liability ledger 128 to various tax authorities 140, including local, state, and federal tax agencies, as appropriate. In addition, the payroll service server 124 makes tax payments to these tax authorities, in accordance with tax payment frequency rules 130, preferably through a third party bank making ACH credits to the appropriate Federal Reserve accounts. The payroll service server 124 debits a bank account of the employer at its bank 136 for the amount of the tax payments (and for any service fees) and transmits acknowledgement information back to the client computer 102 indicating the amounts of the tax payments and fees, and other related information.

B. Client Side Payroll Processing

Figure 2:
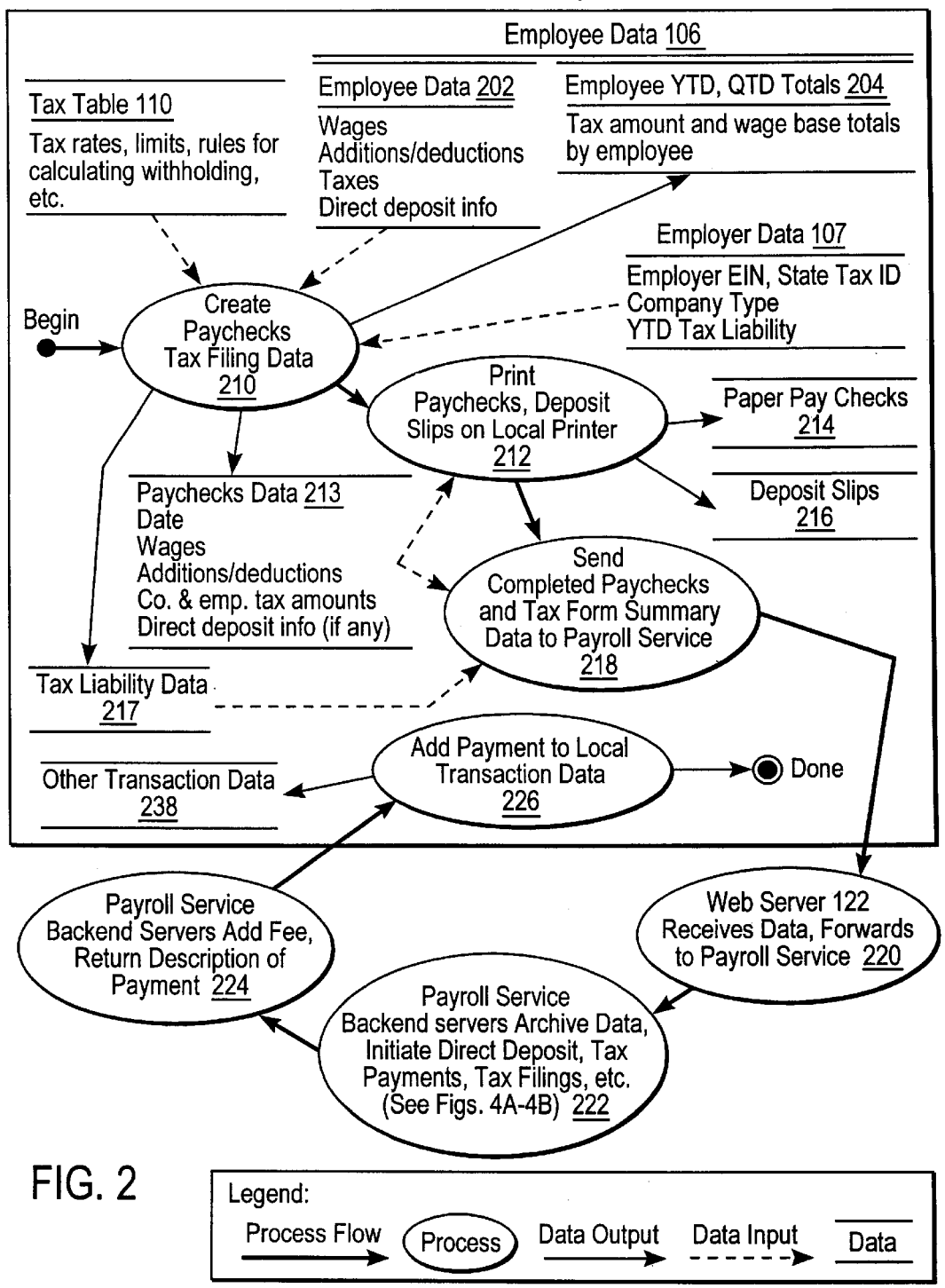
FIG. 2 is a data flow diagram of the payroll processing on the client computer.

Referring now to FIG. 2, there is shown the payroll processing data flow on the client computer 102, as managed by the AP software 104. As shown in more detail in this figure, the tax table 110 data includes tax rates, income limits for each tax rate, and rules for calculating tax withholdings, as these elements are normally used by those of skill in the art. Employee data 106 includes two groups of data: employee data 202 and employee year-to-date data 204.

Employee data 202 includes each employee's wages, additions or deductions to pay, company contributions, qualified pension plan status and amounts, federal and state tax amounts or rates, sick and vacation time, and similar employee-specific data which will be used to calculate payroll for the employee.

Figures 5, 6:
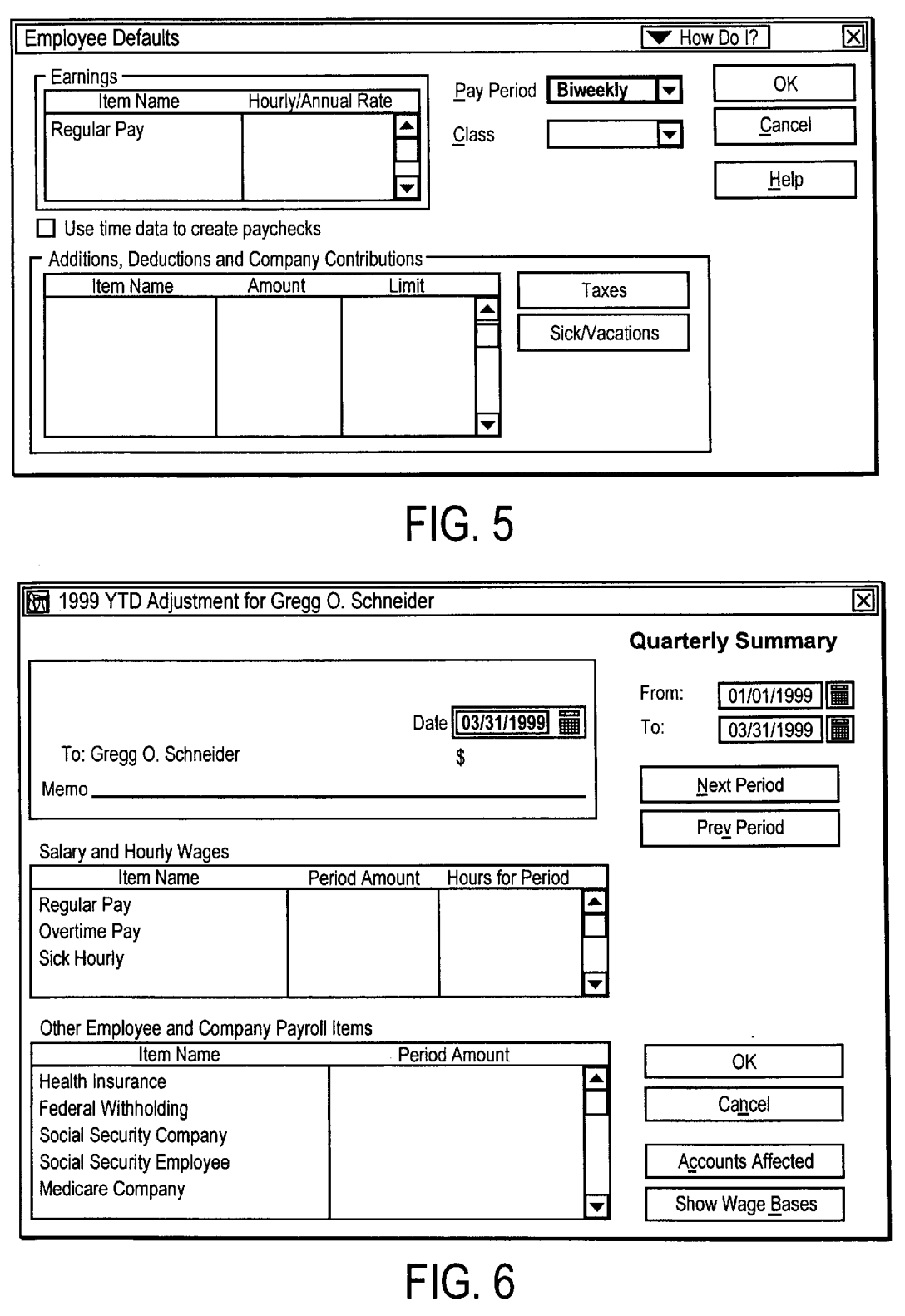

FIG. 5 illustrates an exemplary employee dialog box for entering employee information. Individual employee information is then based on a selected employee template and customized with employee-specific information, such as employee name, address, social security number and tax-exempt status if applicable, tax information, and direct deposit information, if direct deposit is desired by the employee.

Employee year-to-date and quarter-to-date totals 204 store tax and wage totals for each employee for these time periods, including year-to-date paychecks. FIG. 6 illustrates an exemplary dialog box for adjusting year-to-date information for an employee. This information is used in conjunction with the employee data 202 associated with each employee to calculate payroll for each employee.

Employer data 107 is also stored and used by the AP software 104. This includes employer company information (e.g., legal name, address, federal employer identification number, state tax payer ID, company legal type), and year-to-date tax liability information for payroll taxes and other expenses and liabilities of the employer. FIG. 7 illustrates an exemplary dialog box for entering year-to-date information for an employer. This information is typically entered during an initial setup phase, and then automatically updated during each payroll.

Figure 3:
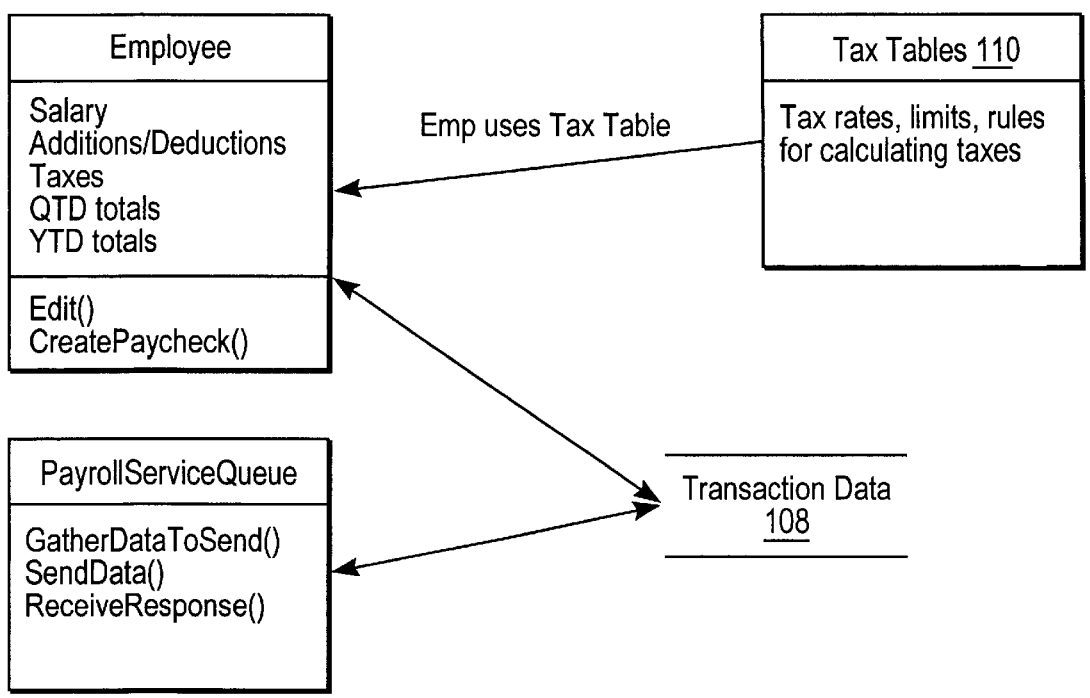
FIG. 3 is a class diagram of the classes used by the accounting/payroll software.

FIG. 3 illustrates software classes which store the above employee information for these tables. The employee classes include the above-mentioned data as attributes, and methods to edit this data and to create a paycheck for the employee. The default information for each employee is defined or updated as needed-for example, when an employee is hired or has a change in their wages, benefits, or other data which impacts their paycheck and taxes.

Payroll processing on the client computer 102 is as follows:

210: A designated user of the AP software 104 at the employer (e.g., a payroll supervisor) creates the paycheck data 213 for a number of employees for a current pay period. This is done by selecting the appropriate employees and pay period. FIG. 8 illustrates an exemplary dialog box for selecting employees for payroll. The AP software 104 calculates for each selected employee their payroll information, including an amount of the paycheck, and the appropriate tax deductions and other deductions (e.g., insurance, social security, etc.) and additions, using the tax tables 110. The AP software 104 further calculates tax liability data 217 for the employer. In a preferred embodiment, the AP software 104 performs the following actions when creating a paycheck for an employee:

Updates the date of the last payroll check/deposit written for the employee (or group of employees) and removes the employee from the list of currently selected employees;

increases or decreases accrued sick or vacation hours by the number of hours on the paycheck;

records the payroll check in the appropriate business checking account; when the paycheck information is subsequently transmitted to the payroll service, the AP software 104 reduces that account's balance accordingly;

records an increase in each affected tax liability account, reflecting the extra liability resulting from the payroll transaction, for both employee paycheck deductions and company contributions;

updates and tracks payroll expenses in business expense accounts, and updates any other accounts that have been assigned to payroll items used in the payroll for the employee.

The calculated payroll information can be immediately reviewed by the employer to identify and correct any errors or omissions, or to void or delete a paycheck if necessary. FIG. 9 illustrates an exemplary dialog box for reviewing and correcting an individual employee payroll. This feature is beneficial because the employer can correct payroll errors before payroll is paid, rather than afterwards as with conventional payroll services.

212: Some employees will receive their pay via a printed check, others by direct deposit. Accordingly, the AP software 104 prints the appropriate paper paychecks 214 and direct deposit slips 216 on a local printer coupled to the client computer 102, using the calculated paycheck data 213.

The AP software 104 prints paystubs including employee name, address, SSN, pay period start and end dates, salary and hourly rate, hours, and amount of pay, taxes, deductions and additions, taxable company contributions, federal and state allowances, net pay, and year to date summaries.

218: When the paycheck calculations are completed, the AP software 104 prompts the user to go online to the payroll computer system 120 to engage its payroll processing functions. (Alternatively, as will be described with respect to FIG. 4, the user may log into the payroll service before calculating payroll). The AP software 104 displays a dialog, such as shown in FIG. 10, identifying the various payroll information that will be sent, and any payroll-related information that has been recently received from the payroll computer system 120. In the event that the employee needs to make payments that are not supported by the payroll service, the employee may enter these items directly. FIG. 11 illustrates an exemplary dialog box for the user to enter such additional tax liability items.

220: When the user connects to the web server 122, the AP software 104 then transmits the completed paycheck information and tax liability information to the web server 122, which then forwards the information to the payroll service's payroll computer system 120.

222: The payroll service performs various processing functions including archiving the received data, initiating direct deposit transactions and tax payments, and making tax information filings. These processes are described in further detail with respect to FIG. 4.

Figure 12:
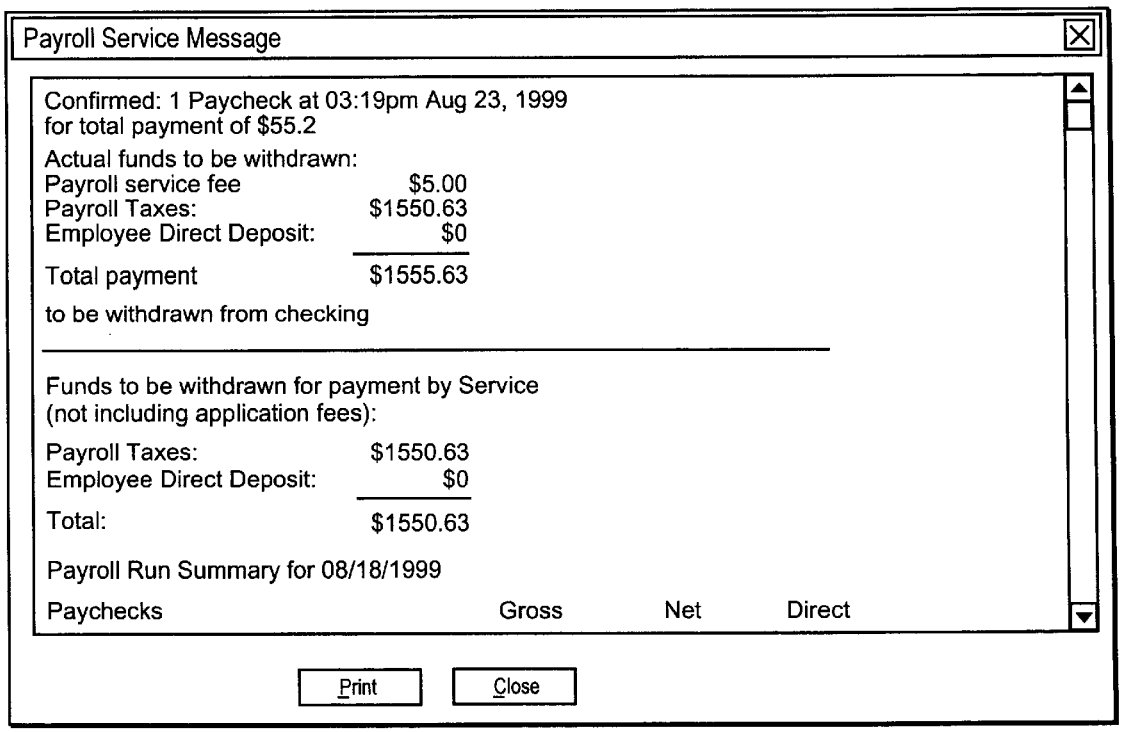
FIG. 12 is a dialog box containing summary information received from the payroll computer system following a completed payroll process.

224: The payroll service then calculates and adds an appropriate service fee for its various processing functions, and transmits this fee item, along with tax payment items back to the client computer 102. The AP software 104 receives this payment information, which can be displayed for the user's review, as illustrated in FIG. 12.

226: As noted above, the AP software 104 creates the corresponding transaction items (e.g., paychecks) in its local store 228 of payroll accounts and other business accounts for the company.

C. Server Side Payroll Processing

Figure 4A:
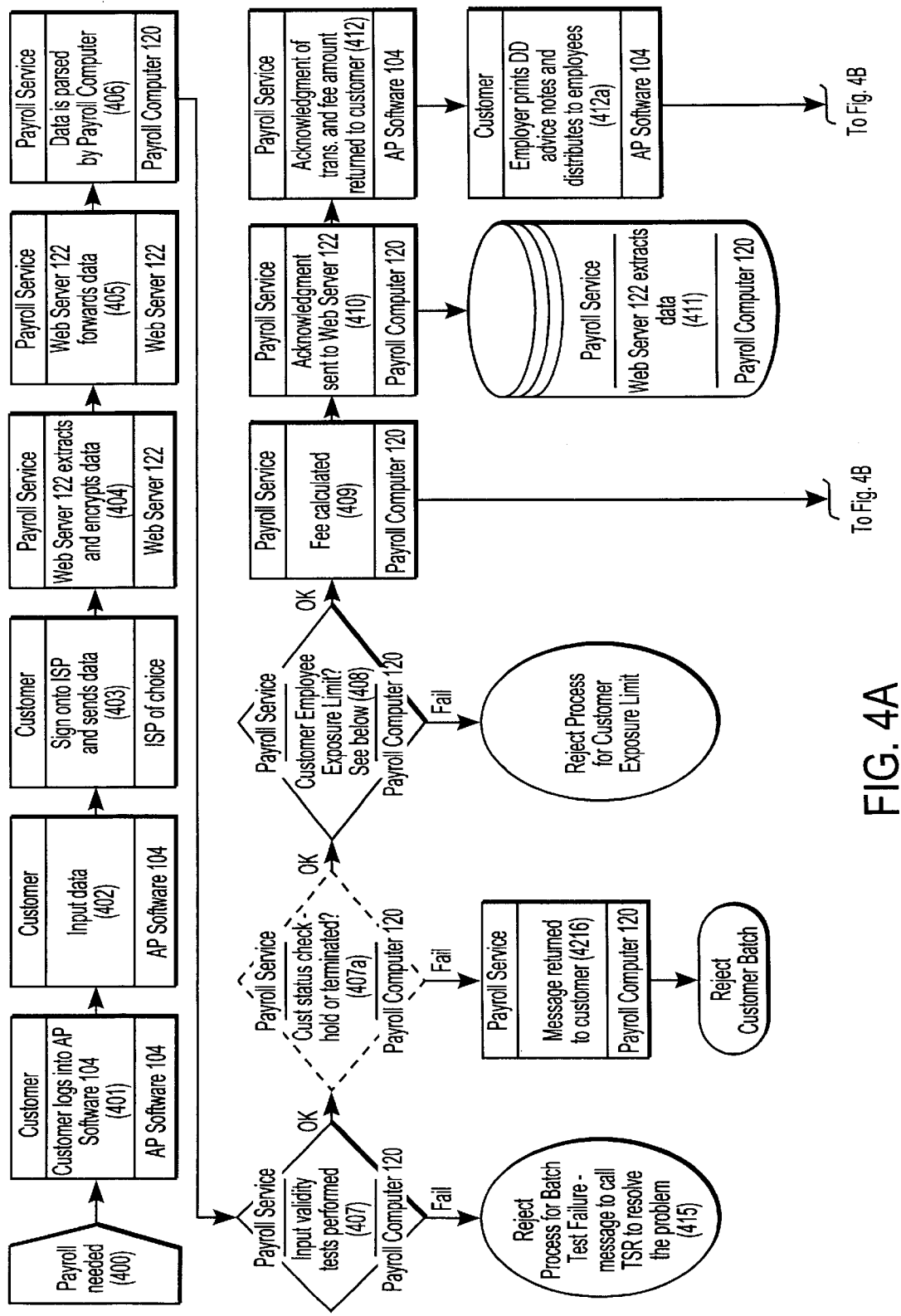
FIG. 4 is flowchart of the payroll processing managed by payroll computer system.
Figure 4B:
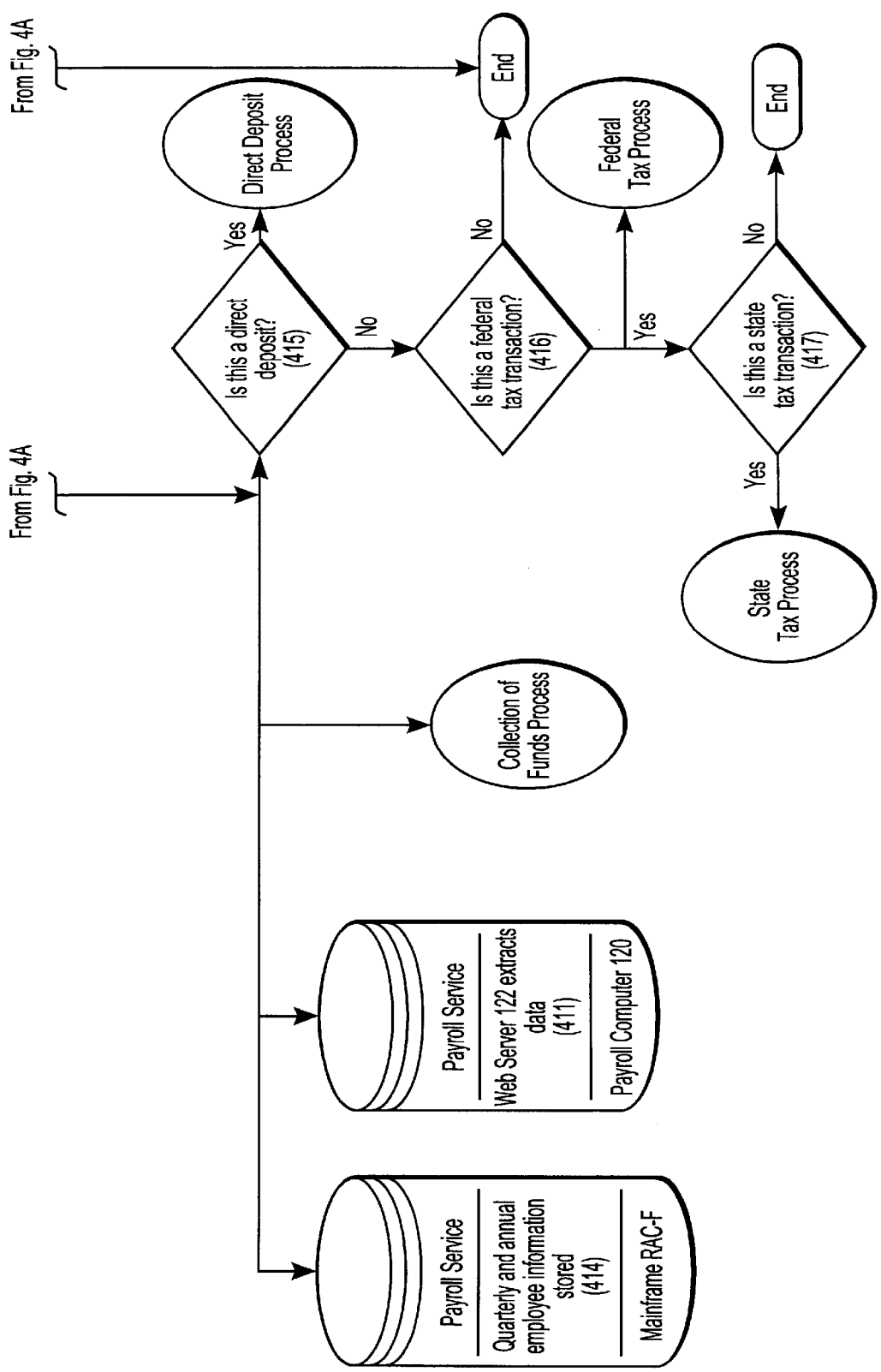

Referring now to FIG. 4, there is a flowchart of the server-side payroll processing. In this flowchart, each processing node is divided into three parts: the top partition identifies the entity that effects the processing step (e.g., the employer using the AP software 104, the payroll service, etc.); the middle partition describes the processing step; and the bottom partition identifies the software/hardware element that executes the processing step.

400: At some point it is determined that a payroll is needed.

401: The employer logs into the AP software 104 to initiate a payroll session. The login is facilitated, for example, with a user interface such as illustrated in FIG. 10.

402: The employer inputs the appropriate payroll data into the AP software 104 to create a current payroll. This step effects the operations described for the client computer 102 with respect to FIG. 2.

403: The employer signs onto its Internet service provider. The AP software 104 gathers all the calculated payroll data, along with other payroll changes since the last online session, and creates a data file. This file includes both the company and employee-based summary data for the payroll service to use on state and federal tax forms; this is because, as described above, the payroll computer system 120 does not calculate its own tax form information, but instead uses the data sent from the client computer. The data file also includes a employer ID number and a password (e.g., PIN).

The AP software 104 transmits the data over a SSL (secure sockets layer) session to the web server 122.

404: The web server 122 receives and extracts the payroll information, and then encrypts this data. Encryption may be performed with various encryption algorithms, such as DES, Triple DES, RSA, or the like.

405: The web server 122 forwards the encrypted data to the payroll computer system 120. The connection is preferably by a high bandwidth connection, such as a T1 line.

406: The payroll computer system 120 decrypts and parses the received data into an internally defined format, which may use either implicitly or explicitly typed (e.g., name-value pairs) data.

407: The payroll computer system 120 performs a validity test on the received data. The input validity test ensures that the client computer 102 is up to date and that the received payroll accurately reflects all previous payroll transactions. If the client's payroll data is not up-to-date relative to the payroll computer system's stored data, the payroll computer 120 retrieves payroll data that is has previously archived and transmits this payroll data to the client computer 102. The data retrieved is for the period from the last time the client transmitted a valid payroll, as determined as a result of the validity test. Any conventional synchronization protocol may be used.

The payroll computer system 120 also checks a employer PIN and ID against a stored list to determine if the transmission is from a currently registered employer. If the PIN and employer ID do not match a registered employer, then a message is returned to the employer via the web server 122. The employer is then responsible for correcting the PIN and ID information within the AP software 104 and transmitting a new batch of payroll information to the payroll computer system 120. If the corrected PIN and ID now match, payroll processing continues normally. If they do not match after several attempts (e.g., 3 to 7), then the payroll computer system 120 imposes a temporary blackout period in which this ID is not allowed to log on. This is to disallow multiple fraudulent guesses at the password.

407a: The payroll computer system 120 determines if the employer's status is "hold" or "terminated," then a message (416) is returned to the client computer 102 indicating that employer's status and that the payroll computer system 120 will not be performing the desired payroll processing. The transmitted data is likewise rejected.

408: Each employer of the payroll service has an exposure limit established by the payroll service to limit its financial exposure when making tax payments and direct deposits on behalf of the employer. These limits are designed to reduce the exposure to fraudulent payroll. In one embodiment, the payroll computer system 120 checks whether the direct deposits for any employee over the course of one or more selected time periods (days to weeks) exceeds one or more thresholds selected by the payroll service, such as individual payrolls exceeding $50,000 over a period of 5 days. If so, then no direct deposits from this payroll will be paid, and a reject process is effected. The reject process includes delivering a message to the employer (e.g., at their email address) via the web server 122 that the payroll direct deposits will not be paid. The employer may submit a new payroll file without the direct deposits and instead write checks for these employees.

409: The payroll computer system 120 calculates a fee (if any) for this session of the payroll service, and adds this fee to the amounts that the AP software 104 has calculated for tax and direct deposit withholding. The payroll computer system 120 creates a formatted transaction for this withdrawal it will make from the employer's account.

The payroll computer system 120 also initiates a collection of funds process to collect the funds for the payroll direct deposits and tax payments. Generally, collection of funds is as follows: The payroll computer system 120 processes the data file received for payroll, and creates a standard ODFI (originating depository financial institution) batch file according to NACHA (National Automated Clearinghouse Association) formats. This file is sent to a payroll depository bank 134 which handles payroll deposits for the payroll service. The payroll depository bank receives the ODFI file, and determines whether the payroll service's allowed maximum payroll is exceeded. If so, then the payroll is rejected. Otherwise, the payroll depository bank combines ODFI with other ACH transactions, and forwards the file to the appropriate receiving depository financial institutions (RDFI's). This initiates the settlement process in which provisional funds are sent from the various employers' bank accounts to the payroll depository bank. The provisional funds are received by the payroll depository bank, and divided into the payroll service's direct deposit, tax, and fee accounts held at the payroll depository bank. This provides the appropriate funds for the payroll service to make the direct deposits and tax payments on behalf of the various employers it services.

410: The payroll computer system 120 transmits an acknowledgment to the web server 122, along with a description of the various direct deposit and tax payments it will be making.

411: The web server 122 extracts the payment information and acknowledgment from the received data and forward it back to the AP software 104.

412: When the AP software 104 receives this confirmation and payment information, it enters the payment in its transaction register as the appropriate payment item.

412a: As shown on FIG. 2 the employer uses the AP software 104 to print the direct deposit advice notices and distribute them to its employees.

413: At the payroll service, the payroll computer system 120 updates its database by archiving the received payroll data for this employer and its payroll period. This will allow the payroll computer system 120 to provide the synchronization and integrity check described at 407.

414: The payroll service directly archives, without additional calculations, the quarterly and annual employee (and company) figures of wages and taxes for later use in filing tax forms.

415: The payroll computer system 120 checks whether there are any direct deposit transactions in the received payroll. If so, then the direct deposit processing is effected; whether or not there are direct deposits, the payroll computer continued with the next step 416. The direct deposit process may operate asynchronously from the rest of the processing, is generally as follows: The payroll service transmits to a payroll depository or processing bank a batch file of direct deposit instructions, including the account numbers of the employees and the deposit amounts for their respective paychecks. The depository bank creates the appropriate ACH batch file and transmits it via the ACH network to one or more of the RDFI's. Each of these receives the transmitted file and settles the transactions by depositing the funds in the various employees' accounts.

In some cases a direct deposit item may be returned to the payroll depository bank, for example because the employee's account has been closed, the account could not be located, the account was invalid, or the account holder was deceased. In this case, the returned item is credited by the payroll depository bank to a clearing account, and a returned items report is transmitted to the payroll service. The payroll computer system 120 transmits a message to the web server 122, which forms the message to the AP software 104, so that the employer that made the direct deposit is informed of the returned item. The payroll service determines whether this employer's account has been placed on a hold (e.g., if the employer is suspected of fraud). If so, then the payroll service contacts the employer, and informs its that the direct deposit funds will not be returned because of the hold status. The employer corrects whatever data about the employee is incorrect using the AP software 104 (e.g., corrects an invalid account number), and directly writes a payroll check to the employee. If the employer's account is not on hold, then the payroll service informs the employer that the funds will be returned by an ACH transfer to the employer's banking account at its bank 136. The payroll computer system 120 sends an instruction to the payroll depository bank to return the employer's funds. Again, the employer will correct whatever data is incorrect and directly write a check to the employee.

416: The payroll computer system 120 also checks whether the payroll is a federal tax transaction, that is, whether federal taxes are due for this payroll. If so, then the federal tax collection process is effected; again, this may occur asynchronously. Whether or not the payroll results in federal taxes, the payroll computer continued with the next step 417.

In the federal tax process, the payroll computer system 120 creates a tax ledger data file using the federal tax liability information calculated by the AP software 104. The payroll computer system 120 may separately calculate federal tax liabilities, but this is optional and if done, is used merely to verify the accuracy of the primary calculations performed by the AP software 104. If tie tax liability is less than $100 k, the payroll computer system 120 initiates the appropriate ACH transfers from the payroll service's bank account to the appropriate Federal Reserve accounts for the tax liability of the employer, and then separately initiates a funds collection process to collect these finds from the employer's bank account via the ACH. If an employer exceeds $100K in unpaid federal tax liability at any time (even if the payment is not yet due), the employer's federal tax payment frequency switches to "Next Day" thus requiring that the payment must be made immediately. In this case, the payroll service does not have time to verify that the employer has sufficient funds before making the payment itself. Accordingly, the payroll computer system 120 instead initiates the payment directly from the employer's bank account. In this way, the employer is responsible if there are insufficient funds to pay the tax liability. On a quarterly basis, the payroll computer system 120 generates a tape of Federal Tax 941 forms and causes these to be transmitted to the Internal Revenue Service. The payroll computer system 120 also prints the 941 form for each employer and mails it to the employer. At the end of each year, the payroll computer system 120 generates a tape of Federal Tax 940 forms (or prints them) and transmits these to the Internal Revenue Service. Duplicate 940 forms are mailed to each employer. Also at the end of each calendar year, the payroll computer generates a file to be sent to the Social Security Administration with the payroll data of each of the employer's employee's W-2 data. The payroll computer prints the W-2s and mails them to each of the employers.

417: The payroll computer system 120 also checks whether the payroll is a state tax transaction, that is, whether state taxes are due for this payroll. If so, then a state tax collection process is effected; again this may happen asynchronously.

The state tax process also relies upon the tax liability calculations made by the AP software 104, and optionally may verify these calculations. Generally, the state tax process is as follows: The payroll computer system 120 stores state tax information on an employee by employee basis, along with company summary figures. The federal tax information is similarly stored. To make a state tax payment on behalf of some number of employees, the payroll computer system 120 determines the form of payment that is acceptable to the state tax agency, by consulting stored data about each state's tax filing requirements. For state tax agencies that accept ACH transfer, the payroll computer system 120 transmits an authorization to the state agency to debit the payroll service's tax payment account for the amount of the tax payments. The state agency in turn forwards this authorization to a tax processing bank, which effects the ACH transfers to the state agency's bank account. For state agencies that accept only individual payments, the payroll computer system 120 prints a payment coupon for each employee and prints a check for each payment that is due. This check is written on the payroll service's tax payment account, and is sent to the state agency along with the printed coupons. For state agencies that accept summarized payments, the payroll computer system 120 generates a tape of payments indicating each employee and the payment amount. The payroll computer system 120 then prints a summary check for the total payment amount, and the combined tape and payment are mailed to the state agency.

On a quarterly and yearly basis, a wage listing report is generated by the payroll computer system 120. If the wage information must be transmitted on state tax forms, then these forms are manually created from the wage listing data. Otherwise the payroll computer system 120 generates the wage report and prints it for transmission to the state agency. Duplicate forms are mailed to each employer.

As changes are made in the state and federal tax tables, these changes are transmitted from the payroll computer system 120 to each client computer 102 and stored for use by the AP software 104. This ensures that the AP software 104 always has the current tax tables 110 from which to calculate payroll.

D. Registration

To use the client-server payroll processing features of the payroll computer system 120 and payroll service, the company using the AP software 104 first must register with the payroll service. Registration is also accomplished online via web server 122. Online registration is as follows:

First, the employer provides the following information to the AP software 104 via various dialog boxes:

a Federal Employer Identification Number (EIN);

a unique serial number or application number that is assigned to them (or to the AP software 104) by the payroll service (e.g., by email or a telephone call to the service);

employer legal name and address;

financial institution routing and account numbers;

frequency of payment of federal payroll taxes;

seasonal employer status;

sole proprietorship status or unincorporated partnership status; and primary company contact With this information, the company can be enrolled in the payroll service. The company then provides for each employee:

name, address, social security number;

employee type (e.g., regular, officer, statutory, representative, or owner);

hire and release dates;

tax exempt status; and financial institution routing and account numbers for those employees wanting direct deposit.

The company further provides:

state unemployment tax rates for employees and the company;

federal unemployment tax credit status;

taxability of any custom payroll items;

state employer tax ID number; and one or more personal identification numbers (PINS).

Once this information is collected, the AP software 104 connects online to the payroll computer system 120, via conventional web protocols, and transmits this information to the payroll computer system 120. The payroll computer system 120 establishes an account for the employer, and records the provided information for later use when processing the employer's payroll.

In summary, there has been described an online, client-server payroll processing system that efficiently distributes payroll functions between a client computer and AP software managed by an employer/company and a payroll service operating a payroll computer system. Unlike conventional payroll approaches which place all of the payroll processing duties entirely under the control of either the company itself (doing its own payroll) or the payroll service, the present invention selectively divides the payroll processing functions between the company and the payroll service. The company, via AP software, performs all of the necessary payroll calculations including both employee payroll calculations and company tax liability calculations. This feature gives the company complete control over its payroll, along with the efficiencies that result from being able to modify and correct payroll errors, and the like. The payroll service, via the payroll computer system, is responsible for the payroll responsibilities that it can most efficiently perform, including effecting direct deposit and tax payments and tax filings. Because the payroll service does not have to calculate individual payroll items, as in conventional approaches, it need not acquire, manage, and store employee information that is typically used to calculate payroll, such as employee wages, tax rates, deductions, and so forth. This relieves the payroll service of the time and labor intensive aspects of maintaining this information, which is already present in the employer's system. By avoiding this aspect of payroll processing, the present invention presents a more efficient and flexible system for the payroll service. This allows the payroll service of the present invention to operate on behalf of a larger number of employers than most conventional payroll services, and yet provide the same desired features of such services. Another significant benefit is that the employer can process payroll off-line, that is—even if the payroll computer system 120 is temporarily unavailable, or if the employer is using a temporarily unconnected laptop, or the like. This gives the employer the ability to do the significant payroll processing at its convenience, not at the convenience of the payroll service.

We claim:

1. A computer implemented method for payroll processing for an employer having employees for whom the payroll is created, comprising:

storing on a client computer located at the employer, payroll setup data describing for each employee, wage information, tax status, and deduction information;

receiving at the client computer payroll data for the employees for a specific pay period;

calculating at the client computer pay check information for each employee, the pay check information including wages, taxes, and deductions for the employee;

transmitting from the client computer to a remote payroll service the calculated pay check information for execution by the payroll service of direct deposits of pay check amounts for selected employees, payment of the employer's tax liabilities, and tax filings for the employer, and printing at the client computer pay checks and direct deposit advice notices for distribution to employees of the employer;

receiving in a transmission from the payroll service a statement of a fee charged for payroll processing; and entering into an account register a transaction deducting the charged fee and the paid tax liabilities.

2. The method of claim 1, further comprising:

receiving a confirmation of the executed direct deposits; and entering into the account register the executed direct deposit transactions to update the account balance.

3. A computer implemented method of payroll processing for an employer, the employer possessing a client computer storing payroll setup data describing for each employee of the employer, wage information, tax status, and deduction information of the employee and calculating pay check information for each employee using the payroll setup data for each employee and payroll data for a specific pay period, comprising:

receiving from the client computer the calculated pay check information for each of a plurality of employees of the employer, the pay check information indicating for each employee a pay check amount and whether the employee is to receive the pay check amount by a direct deposit or by a printed pay check;

for each employee indicated to receive a direct deposit, executing transaction instructions to a financial institution to effect the direct deposit of the pay check amount into an account of the employee without separately calculating the paycheck amount for each employee; and transmitting to the client computer a statement of a fee charged for payroll processing.

4. The method of claim 3, further comprising:

transmitting a confirmation of the total amount of execute direct deposits to the client computer.

5. The method of claim 3, further comprising:

transmitting tax information for the plurality of employees and the employer for at least one pay period to at least one tax authority.

6. The method of claim 3, further comprising:

filing tax liability payments of the employer with at least one tax authority on behalf the employer; and transmitting a statement to the client computer indicating the total amount of tax liability payments made.

7. The method of claim 3, further comprising:

periodically transmitting to the client computer an updated tax table.

8. A computer implemented method of payroll processing for an employer, the employer possessing a client computer storing payroll setup data describing for each employee of the employer, wage information, tax status, and deduction information of the employee and calculating pay check information for each employee using the payroll setup data for each employee and payroll data for a specific pay period, comprising:

receiving at a payroll computer from the client computer the calculated pay check information for each of a plurality of employees of the employer, the pay check information indicating for each employee a pay check amount and whether the employee is to receive the pay check amount by a direct deposit or by a printed pay check;

for each employee indicated to receive a direct deposit, executing at the payroll computer transaction instructions to a financial institution to effect the direct deposit of the pay check amount into an account of the employee without separately calculating the paycheck amount for each employee;

determining whether the paycheck information received from the client computer is valid;

responsive to the paycheck information not being valid, transmitting archived payroll data for at least one payroll pay period prior to the current date to the client computer; and receiving from the client computer recalculated paycheck information.

9. A system for payroll processing, comprising:

a client computer having a combined accounting and payroll software product, the software product maintaining:
  i) a data store of employee payroll setup information including employee tax status, wages, tax deduction information, and year to date payroll information;
  ii) a data store of employer payroll information including employer year to date payroll expenses and tax liabilities;
  iii) a tax table including tax rates applicable to the employee or employer; and
  iv) an account register;

the software product adapted to:
  calculate for a selected number of employees payroll information for a specific pay period using the respective employee's payroll setup information and the tax table;
  transmit the calculated payroll information to a payroll computer system indicating those employees that receive their paycheck via direct deposit;
  print paychecks for those employees who receive their paycheck in printed form; and
  update the account register for credits and debits;

the payroll computer system adapted to:
  receive the calculated payroll information from the client computer;
  effect direct deposits of those employees indicated to receive their paycheck via direct deposits;
  store an archive of the payroll information;
  transmit tax payment information for the employer to a tax authority; and
  transmit to the client computer a statement of a fee charged for payroll processing,
    wherein the software product on the client computer is further adapted to record the fee as a debit on the account register.

* * * * *

UNITED STATES PATENT AND TRADEMARK OFFICE
CERTIFICATE OF CORRECTION

PATENT NO. : 6,411,938 B1
DATED : June 25, 2002
INVENTOR(S) : Martin O. Gates et al.

It is certified that error appears in the above-identified patent and that said Letters Patent is hereby corrected as shown below:

<u>Title page,</u>
Item [57], ABSTRACT,
Line 12, delete the word "to" in the sentence to read as follows: "print advice of deposit slips for this latter type of employee".

<u>Column 14,</u>
Line 45, change "execute" to -- executed --.

Signed and Sealed this

Third Day of December, 2002

JAMES E. ROGAN
*Director of the United States Patent and Trademark Office*